United States Patent
Han et al.

(10) Patent No.: US 6,188,818 B1
(45) Date of Patent: Feb. 13, 2001

(54) LOW LOSS AWG DEMULTIPLEXER WITH FLAT SPECTRAL RESPONSE

(75) Inventors: Dong-Kyoon Han, Seoul; Hyoun-Soo Kim, Songnam, both of (KR)

(73) Assignee: Samsung Electronics Co., Ltd., Kyungki-Do (KR)

(*) Notice: Under 35 U.S.C. 154(b), the term of this patent shall be extended for 0 days.

(21) Appl. No.: 09/410,802

(22) Filed: Oct. 1, 1999

(30) Foreign Application Priority Data

May 11, 1999 (KR) .................................................. 99-16784

(51) Int. Cl.[7] ...................................................... G02B 6/28
(52) U.S. Cl. .............................................. 385/24; 359/109
(58) Field of Search ........................... 385/242; 372/45, 372/46, 50, 12, 18, 19, 20, 28; 359/109, 114, 115, 118, 124

(56) References Cited

U.S. PATENT DOCUMENTS

| | | | |
|---|---|---|---|
| 5,499,256 | * 3/1996 | Bischel et al. | 372/28 |
| 5,513,196 | * 4/1996 | Bischel et al. | 372/22 |
| 6,052,397 | * 4/2000 | Jeon et al. | 372/45 |

* cited by examiner

*Primary Examiner*—Akm E. Ullah
(74) *Attorney, Agent, or Firm*—Steve Cha; Klauber & Jackson (57) ABSTRACT

An optical wavelength multiplexer/demultiplexer, capable of exhibiting flat spectral response characteristics while minimizing insertion loss, is proposed. The optical wavelength multiplexer/demultiplexer, used in WDM systems, includes a first slab waveguide for dividing powers of input optical signals coupled from the input optical waveguides, an arrayed waveguide grating for guiding the optical signals from the first slab waveguide therethrough in such a fashion that the optical signals have constant phase difference in neighboring waveguides, a second slab waveguide in which the optical signals from the arrayed waveguide grating converge into the focal positions according to their wavelengths, and a taper waveguide interposed between the second slab waveguide and output waveguides and adapted to obtain a flat spectral response while minimizing an insertion loss.

7 Claims, 7 Drawing Sheets

LOW LOSS AWG DEMULTIPLEXER WITH FLAT SPECTRAL RESPONSE

CLAIM OF PRIORITY

This application makes reference to, incorporates the same herein, and claims all benefits accruing under 35 U.S.C. §119 arising from an application entitled, "LOW LOSS AWG DEMULTIPLEXER WITH FLAT SPECTRAL RESPONSE" earlier filed in the Korean Industrial Property Office on May 11, 1999 and there duly assigned Ser. No. 1998-16784.

BACKGROUND OF THE INVENTION

1. Field of the Invention

The present invention relates to an optical wavelength multiplexer/demultiplexer used in a wavelength-division multiplexing (WDM) system, and more particularly to an optical wavelength demultiplexer capable of exhibiting flat spectral response characteristics while minimizing insertion loss.

2. Description of the Related Art

The operation of an optical wavelength multiplexer/demultiplexer using an arrayed waveguide grating (AWG) structure can be defined using a grating equation describing dispersion characteristics of incident light resulting from a diffraction of the incident light under the condition in which an array of waveguides is regarded as a diffraction grating. Such an optical wavelength multiplexer/demultiplexer is referred to as an AWG optical wavelength demultiplexer.

Such an AWG optical wavelength demultiplexer is an optical device used in a WDM system to couple optical signals of different wavelengths or to divide an optical signal into those of different wavelengths. Light incident to such an AWG optical wavelength demultiplexer varies in phase while passing through three parts of the AWG optical wavelength demultiplexer, that is, a first slab waveguide, an AWG, and a second slab waveguide. The phase variations of light respectively generated by the parts of the AWG optical wavelength demultiplexer are summed at the final output plane of the AWG optical wavelength demultiplexer, so that a reinforced interference effect is obtained at the final output plane. The above mentioned grating equation is an equation for deriving a condition in which a reinforced interference effect is obtained at the final output plane of the AWG optical wavelength demultiplexer by virtue of the sum of the phase variations. Here, the final output plane is an interface of the second slab waveguide with an output waveguide. Assuming that light is incident to a central input waveguide, the above mentioned grating equation is expressed as follows:

$$n_s d \sin \theta + n_c \Delta L = m\lambda \quad \text{[Expression 1]}$$

where, "$n_s$" represents effective refractive index of the first and second slab waveguides, "$n_c$" an effective refractive index of the channel waveguides AWG, "d" the pitch of the AWG, "m" the order of diffraction, "$\Delta L$" a length difference between adjacent waveguides in the AWG, and "$\lambda$" the wavelength of incident light, respectively.

The central operating wavelength $\lambda_0$ corresponds to the wavelength of light when "$\theta$" in Expression 1 corresponds to zero. This central operating frequency $\lambda_0$ is defined as follows:

$$\lambda_0 = \frac{n_c \Delta L}{m} \quad \text{[Expression 2]}$$

From Expression 1, it is possible to derive an equation of a variation in the diffraction angle of light depending on a variation in wavelength. After differentiating both sides of Expression 1 with regard to the wavelength 1, the following Expression 3 is derived:

$$\frac{d\theta}{d\lambda} = \frac{m}{n_s d} \quad \text{[Expression 3]}$$

Referring to Expression 3, it can be found that a variation in the wavelength of incident light results in a variation in the wavefront direction of the light. Such a variation in the wavefront direction of the light results in a variation in the main lobe position of an interference pattern formed on the image plane of the second slab waveguide.

The spectral response of the optical wavelength demultiplexer can be derived using an overlap integration between the interference pattern formed on the image plane of the second slab waveguide and the mode of the output waveguide connected to the second slab waveguide However, typical optical wavelength demultiplexers exhibit Gaussian spectral responses because their interference patterns and output waveguide modes have a Gaussian form. When optical wavelength demultiplexers exhibiting such a Gaussian spectral response are applied to a system, it is necessary to accurately control a spectral variation occurring in a laser diode serving as a source for the system. Where such optical wavelength demultiplexers are coupled together in series, a reduction in the passband width of the spectral response occurs between adjacent ones of the optical wavelength demultiplexers. This results in a disadvantage in that the installation and maintenance costs of the system to increase.

In order to solve the above-mentioned problem, the spectral response in each channel should be flat Two methods have been proposed to obtain flat spectral response. The following description will be made in conjunction with these methods.

One method is to adjust the optical path length of the AWG. This method is disclosed in U.S. Pat. No. 5,467,418 issued to Corrado Dragone, Lucent Technologies and is entitled "FREQUENCY ROUTING DEVICE HAVING A SPATIALLY FILTERED OPTICAL GRATING FOR PROVIDING AN INCREASED PASSBAND WIDTH". In accordance with this method, the field distribution of light incident to the second slab waveguide has the form of a sinc function. A diffraction phenomenon occurring in the second slab waveguide can be regarded as a Fourier transform of incident light occurring at the output plane. In order to obtain a flat output profile, accordingly, the above method is adapted to adjust the profile of incident light to have the form of a sinc function corresponding to an inverse Fourier transform of a desired output. In order to obtain such an incident light profile in this method, it is necessary to adjust the lengths of waveguides in the AWG in such a fashion that there is a length difference corresponding to a half-wavelength in at least a portion of the AWG region while intentionally giving loss in accordance with the envelope thereof. For this reason, there is a disadvantage in that the entire device involves additional insertion loss corresponding to the intentional loss given to the AWG.

Another method is to apply a parabolic horn waveguide to an input waveguide coupled to the first slab waveguide of a wavelength demultiplexer in order to obtain flat spectral response characteristics. This method is disclosed in a patent application filed by K. Okamoto, NTT, Japan. The method proposed by K. Okamoto, et al. is disclosed in detail in an article "FLAT SPECTRAL RESPONSE ARRAYED WAVEGUIDE GRATING MULTIPLEXER WITH PARABOLIC WAVEGUIDE HORNS", Electronics Letters, 32, pp. 1961–1962, 1906.

In accordance with this method, the parabolic horn waveguide utilizes the characteristics of the wavelength demultiplexer allowing the mode profile at the first slab input plane to be reconstructed at the output image plane of the second slab waveguide, as it is, thereby forming the input waveguide mode profile into a double peak profile while obtaining a flat final spectral response at the output plane using an overlap integration for the double peak profile. Although it is unnecessary to give an intentional loss, as in the afore mentioned method, this method inevitably involves loss resulting from the fact that the double peak image at the output image plane does not correspond to the local mode of the output waveguide.

As apparent from the above description, both the above mentioned conventional methods inevitably involve additional loss of 2 to 3 dB, as compared to the case involving a Gaussian spectral response, because they are adapted to only vary the image at the image plane while still maintaining the mode of the output waveguide.

SUMMARY OF THE INVENTION

Therefore, the present invention has been made in view of the above mentioned problems, and an object of the invention is to provide an AWG optical wavelength demultiplexer using a taper waveguide arranged between the second slab waveguide thereof and the output waveguide thereof, thereby being capable of achieving a reduction in loss.

Another object of the invention is to provide an AWG optical wavelength demultiplexer using a taper waveguide arranged between the second slab waveguide thereof and the output waveguide thereof, thereby being capable of exhibiting a flat spectral response.

Another object of the invention is to provide an AWG optical wavelength demultiplexer using a taper waveguide arranged between the second slab waveguide and the output waveguide, thereby being capable of exhibiting a flat spectral response while eliminating additional loss which may be involved in conventional methods.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENT

Preferred embodiments of the present invention will be described in detail with reference to the attached drawings. It is to be noted that a detailed description of a known function or structure of the present invention will be omitted if it is deemed to obscure the subject matter of the present invention.

Figure 1:
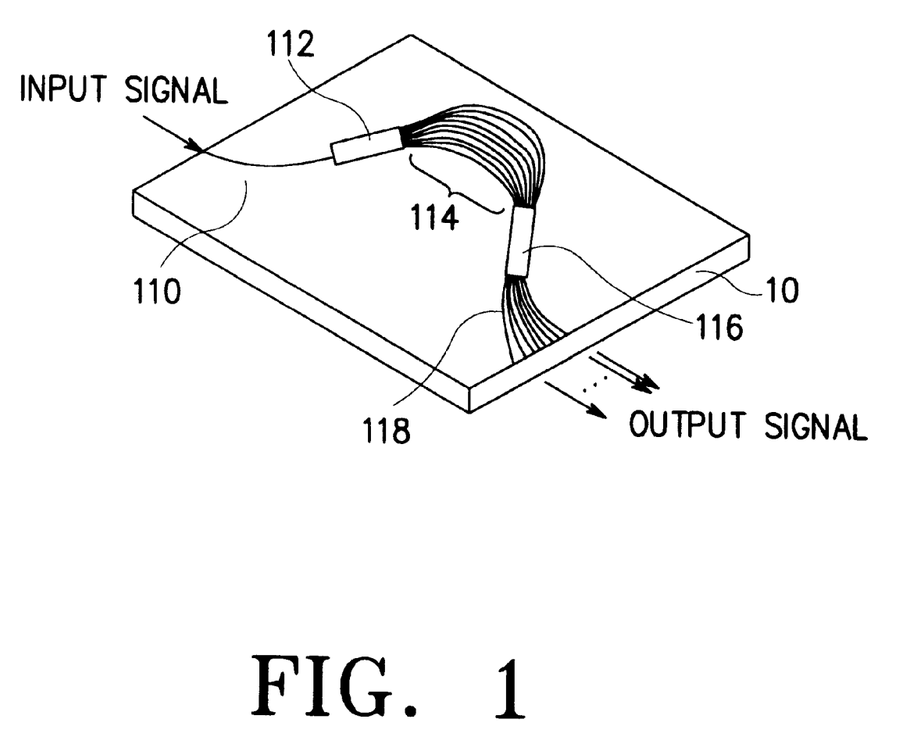
FIG. 1 is an enlarged schematic perspective view illustrating a low loss optical wavelength multiplexer/demultiplexer chip with a flat spectral response using an AWG in accordance with an embodiment of the present invention.
Figure 2:
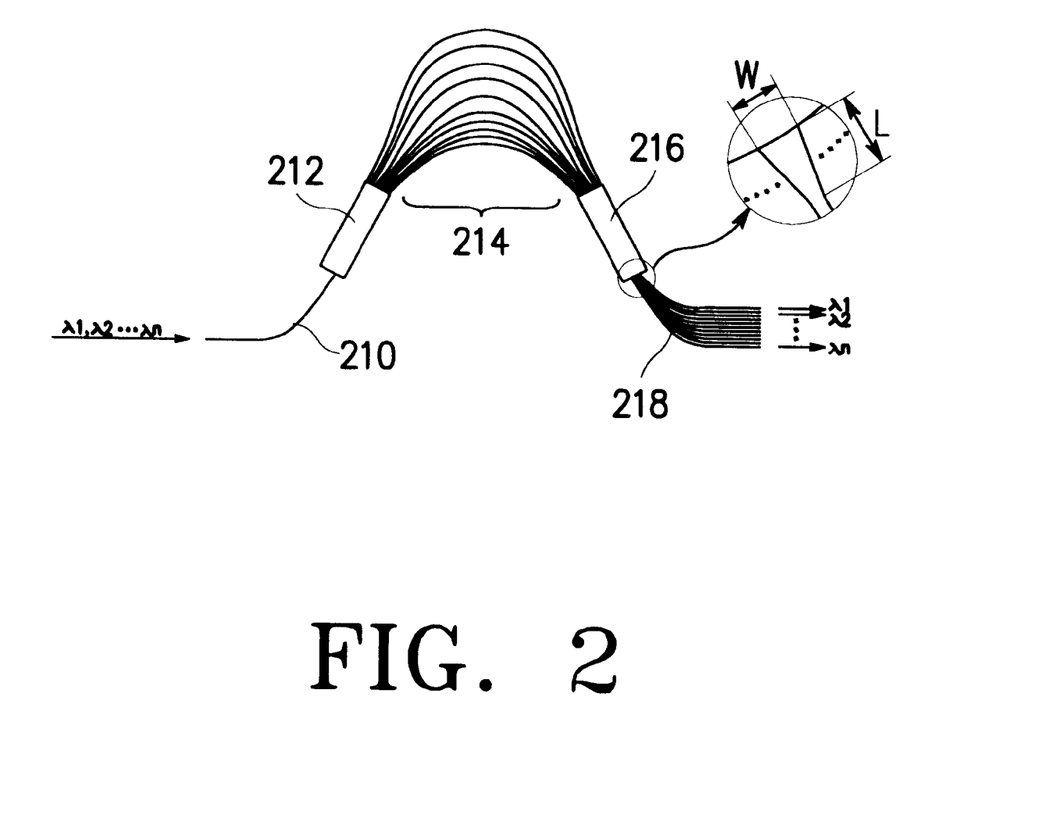
FIG. 2 is an enlarged schematic perspective view illustrating a pattern of the AWG optical wavelength demultiplexer shown in FIG. 1.

FIG. 1 is an enlarged schematic perspective view illustrating a low loss optical wavelength multiplexer/demultiplexer chip with a flat spectral response using an arrayed waveguide grating (AWG) in accordance with an embodiment of the present invention. FIG. 2 is an enlarged schematic perspective view illustrating a pattern of the AWG optical wavelength demultiplexer shown in FIG. 1.

As shown in FIG. 1, the optical wavelength multiplexer/demultiplexer has a waveguide pattern which is formed on a substrate 10 by subjecting the substrate 10 to several patterning processes. Here, the "waveguide pattern" includes waveguides through which an optical signal passes. The AWG optical wavelength demultiplexer includes at least one input waveguide 110 for receiving optical signals of different wavelengths, a first slab waveguide 112 for dividing optical power received from the input waveguide 110, and an AWG 114 coupled to the output terminal of the first slab waveguide 112 and adapted to guide optical signals received from the first slab waveguide 112 in such a fashion that those optical signals have constant phase difference in neighboring waveguides. The AWG optical wavelength demultiplexer also includes a second slab waveguide 116 coupled to the output terminal of the AWG 114 and adapted to separate or couple the wavelengths of the optical signals outputted from the AWG 114, and tapered waveguides (shown in FIGS. 2 and 3) arranged between the output terminals of the second slab waveguide 116 and output waveguides 118 and adapted to obtain a flat spectral response.

Now, the operation of the AWG optical wavelength demultiplexer having the above mentioned configuration will be described. Optical signals received in at least one input waveguide 110 pass through the first slab waveguide 112 and then enter the AWG 114 having a plurality of waveguides with different lengths. The optical signals emerging from the AWG 114 have different phases, respectively. The optical signals of different phases are then incident to the second slab waveguide 116 in which a reinforcement and interference occurs for the optical signals. As a result, the optical signals are focused at one of the output waveguides 118 in a self-imaging fashion. The resultant image is then outputted from the associated output waveguide 118.

The operation principle of the AWG optical wavelength demultiplexer according to the illustrated embodiment of the present invention will now be described in conjunction with FIG. 2.

AWG optical wavelength demultiplexers are implemented by an arrayed waveguide grating configured to vary its wavefront direction depending on a variation in the wavelength of light. In such AWG optical wavelength demultiplexers, a linear dispersion indicative of a variation in the shift of the main peak of an interference pattern on a focal plane (or image plane) depending on a variation in wavelength can be expressed as follows:

$$\frac{dx}{d\lambda} = \frac{fm}{n_s d} \quad \text{[Expression 4]}$$

where "f" represents the focal distance of a slab waveguide, "m" the order of diffraction, "d" the pitch of an AWG, and "$n_s$" the effective refractive index of the slab waveguide, respectively.

In accordance with Expression 4, the wavelength distribution of an optical signal incident to the AWG optical wavelength demultiplexer is spatially focused on the image plane of the second slab waveguide 216. Accordingly, where a plurality of output waveguides 218 are coupled to the image plane while being spaced apart from one another by a predetermined distance, it is possible to implement an AWG optical wavelength demultiplexer having a wavelength spacing determined by the location of the output waveguides 218.

Optical signals respectively outputted from the arrayed waveguides of the AWG 214 while having different phases are subjected to a Fraunhofer diffraction while passing through the second slab waveguide 216. Accordingly, an interference pattern is formed on the image plane. The Fraunhofer diffraction describes the relation between the input optical signals and the diffraction pattern in the form of a Fourier transform. Accordingly, if one of the input optical signals or diffraction pattern is known, it is then possible to calculate the amplitude and phase of the remaining one using a Fourier transform or an inverse Fourier transform.

Figure 3:
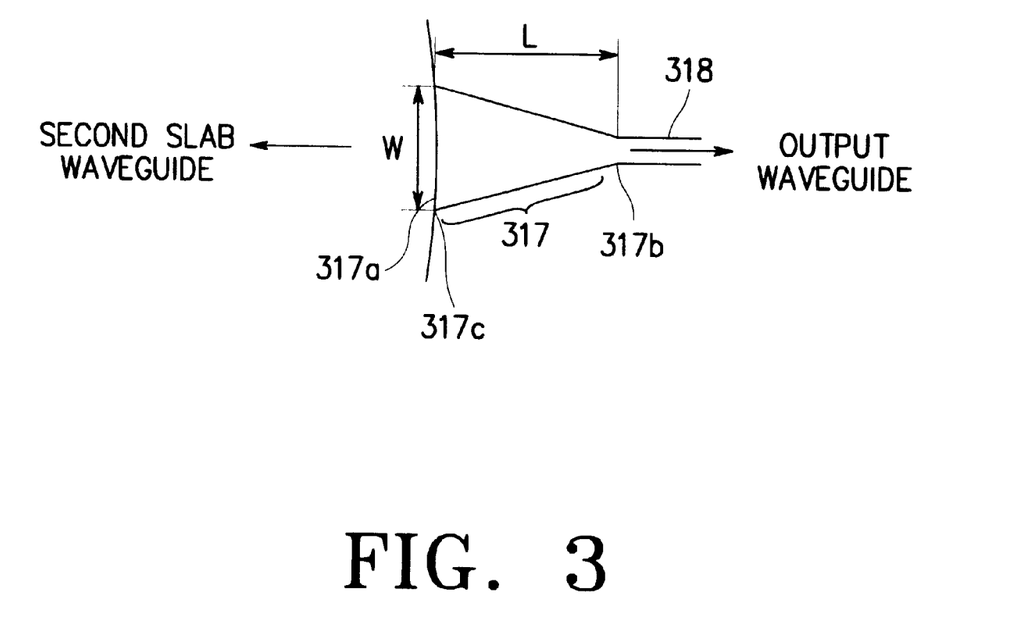
FIG. 3 is an enlarged schematic view illustrating an output taper waveguide according to an embodiment of the present invention.

In accordance with the present invention, as shown in FIG. 3, a taper waveguide 317 is interposed between the second slab waveguide and the output waveguide 318. The taper waveguide 317 is adapted to allow the AWG optical wavelength demultiplexer to obtain a flat spectral response while involving low loss.

Now, the taper waveguide 317 will be described in detail.

The tapered waveguide 317 is interposed between the output terminal of the second slab waveguide and the output waveguide 318. The taper waveguide 317 is a multi-mode tapered waveguide having a plurality of waveguide modes. This tapered waveguide 317 serves as an input terminal of the output waveguide 318.

Preferably, the tapered waveguide 317 has an adiabatic structure in order to prevent a power exchange among waveguide modes during passage of optical signals therethrough. The tapered waveguide 317 enlarges the acceptance angle of incident light, thereby minimizing optical loss.

The input end 317a of the tapered waveguide 317 facing the second slab waveguide has a multi-mode structure. On the other hand, the output end 317b of the tapered waveguide 317 coupled to the output waveguide 318 has the same size as the output waveguide 318.

Figure 4A:
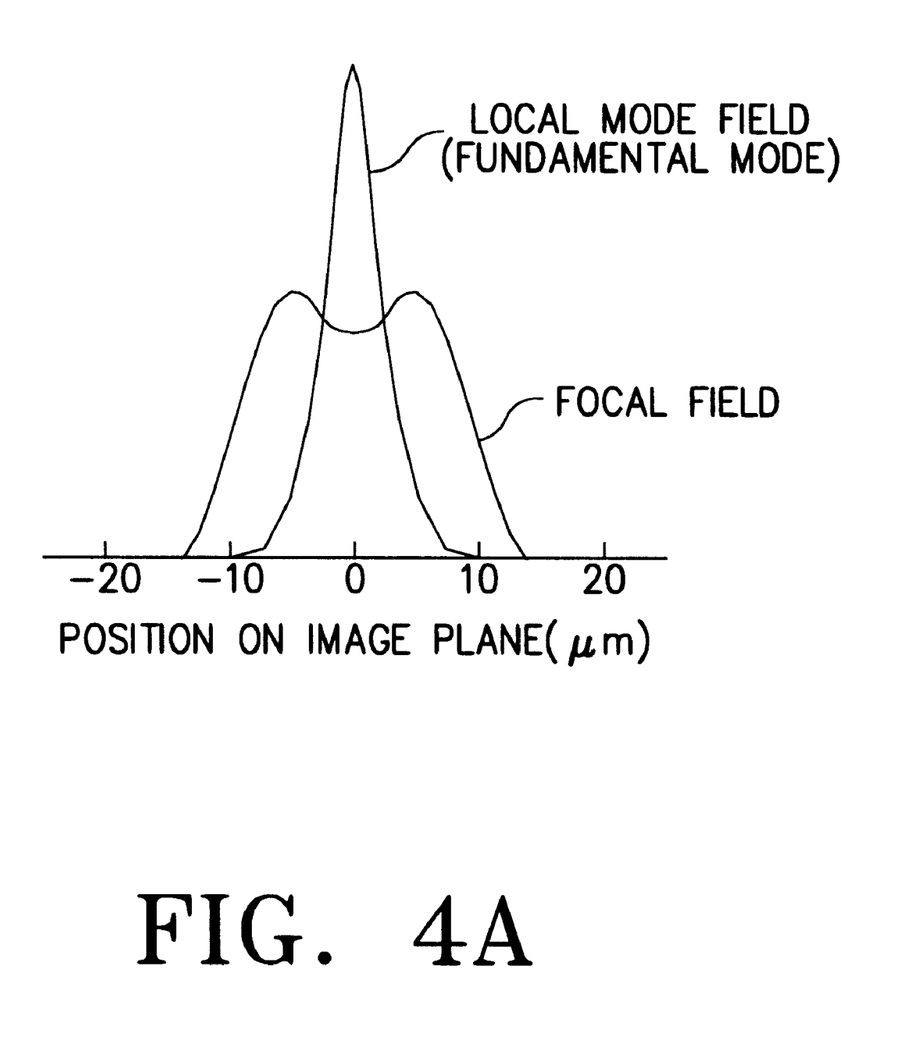
FIG. 4a is a graph depicting a fundamental local mode field of an output waveguide and a focal field formed on an image plane in a conventional AWG optical wavelength demultiplexer.
Figure 4B:
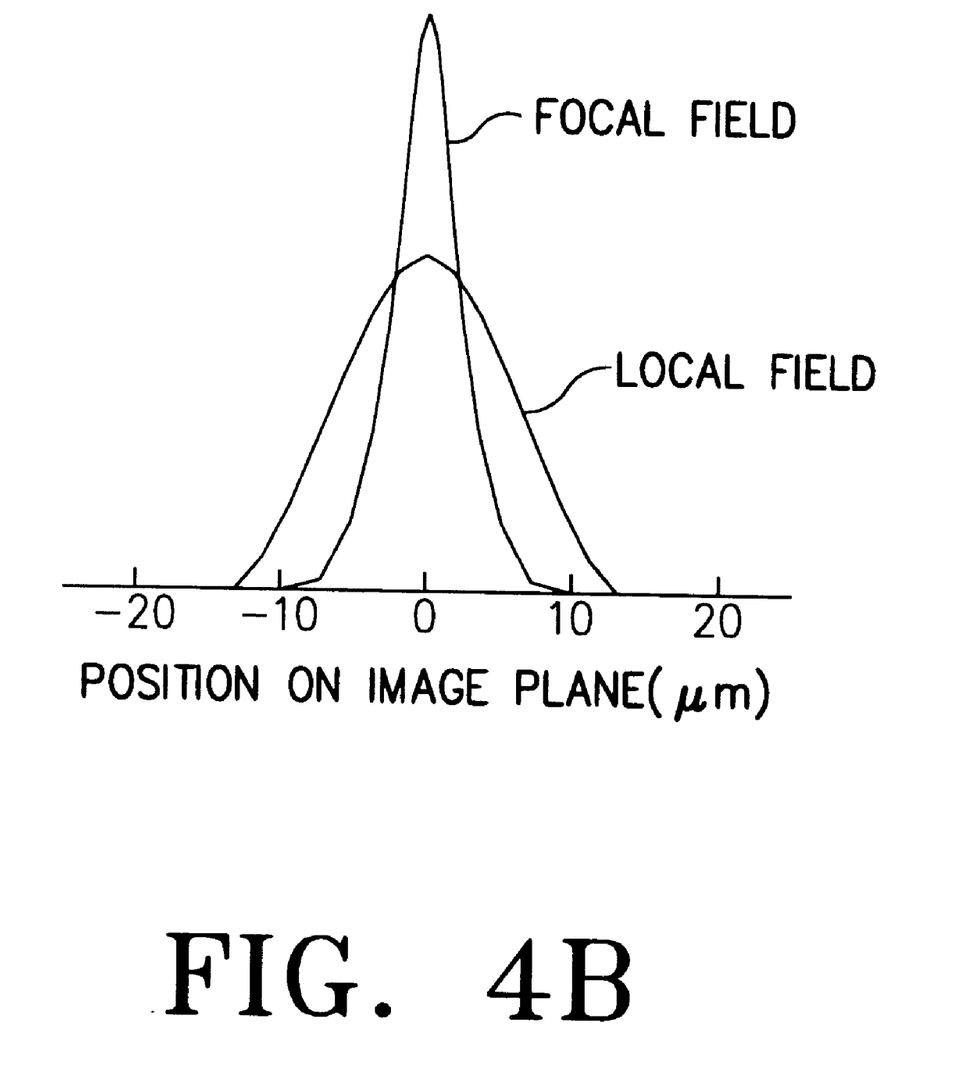
FIG. 4b is a graph depicting a fundamental local mode field of an output waveguide and a focal field formed on an image plane in the AWG optical wavelength demultiplexer of the present invention.

FIG. 4a is a graph depicting a fundamental local mode field of an output waveguide and a focal field formed on an image plane in a conventional AWG optical wavelength demultiplexer. Referring to FIG. 4a, it can be found that an interference pattern having a double peak profile is formed on the image plane in accordance with the conventional AWG optical wavelength demultiplexer. FIG. 4b is a graph depicting a fundamental local mode field of an output waveguide and a focal field formed on an image plane in the AWG optical wavelength demultiplexer of the present invention. Referring to FIG. 4b, it can be found that an interference pattern having the similar profile as the local mode of the output waveguide is formed on the image plane in accordance with the AWG optical wavelength demultiplexer of the present invention. The AWG optical wavelength demultiplexer of the present invention is characterized in that the input terminal of the output waveguide coupled to the second slab waveguide has a tapered structure in order to obtain a flat spectral response. In FIGS. 4a and 4b, the abscissa axis is indicative of the position of an image formed on the image plane. The image formed on the image plane is an image of light outputted from the second slab waveguide.

The tapered waveguide is a multi-mode waveguide having a plurality of waveguide modes. Since the waveguide mode width of the output waveguide is sufficiently large in accordance with the present invention, it is possible to minimize the mode difference between the interference pattern at the focal plane and the fundamental mode of the tapered waveguide.

Figure 5:
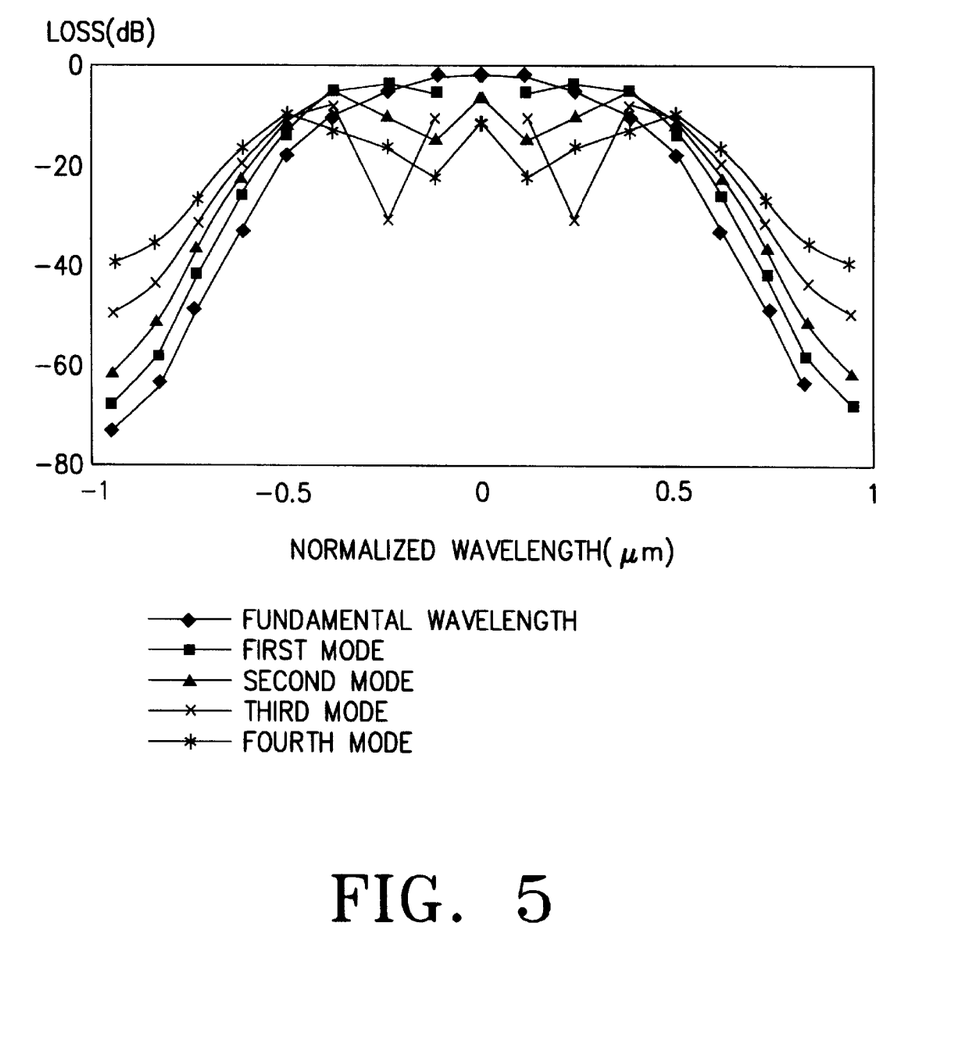
FIG. 5 is a graph depicting an overlap integration between an interference pattern formed on an image plane and each of the modes of an output waveguide in the AWG optical wavelength demultiplexer of the present invention.

FIG. 5 is a graph depicting an overlap integration between the interference pattern formed on the image plane and each of the modes of the output waveguide in the AWG optical wavelength demultiplexer. In the case of FIG. 5, the interference pattern formed on the image plane is coupled to five modes, namely, the fundamental mode through the fourth-order mode, at the output waveguide. The abscissa axis is indicative of a normalized wavelength.

For a multi-mode coupling, an adiabatic taper waveguide structure is applied to the input terminal of the output waveguide, that is, the image plane, in accordance with the present invention. By virtue of such an adiabatic taper waveguide structure, the higher-order components of optical signals except for the fundamental mode components are cut off or radiated while passing through the taper waveguide. As a result, a final frequency response having a centrally-dipped profile is obtained. Such a centrally-dipped profile results from cut-off of coupled power of even modes at the center wavelength of each channel. This centrally-dipped profile serves to increase the flatness of the spectral response.

In order to evaluate the AWG optical wavelength demultiplexer configured to obtain a flat spectral response while minimizing insertion loss in accordance with the present invention, a 16-channel AWG optical wavelength demultiplexer having a wavelength band of 1.5 μm was designed. This AWG optical wavelength demultiplexer also used channel waveguides having a width of 6.5 μm and a refractive index difference of 0.75% between core and cladding layers. The AWG optical wavelength demultiplexer also used a taper waveguide having a width W (FIG. 3) of 25.3 μm and a length L (FIG. 3) of 4,800 μm at its output waveguide portion. In order to calculate the spectral response characteristics of the AWG optical wavelength demultiplexer, a two-dimensional beam propagation method was used.

Figure 6:
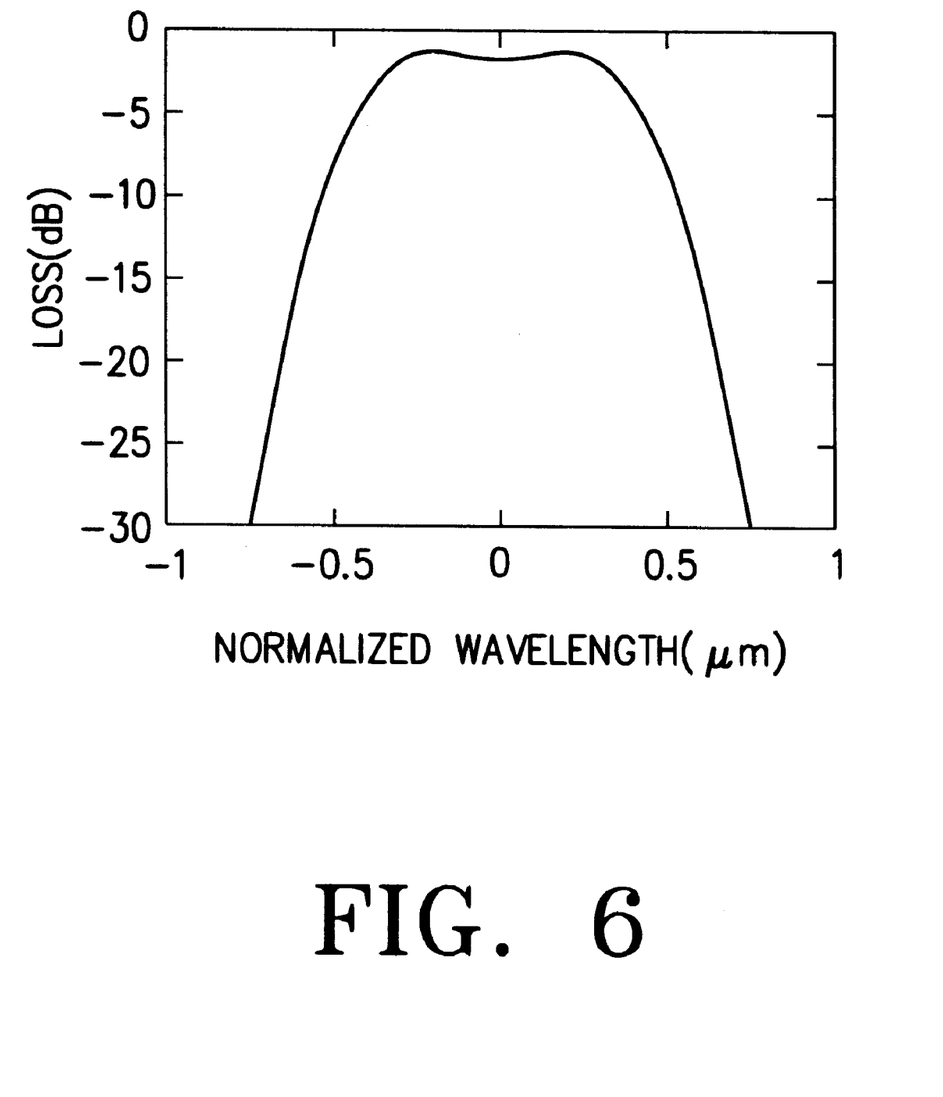
FIG. 6 is a graph depicting loss characteristics calculated for one channel of the AWG optical wavelength demultiplexer of the present invention.

FIG. 6 is a graph depicting spectral response characteristics calculated for the above AWG optical wavelength demultiplexer configured in accordance with the present invention. As shown in FIG. 6, the AWG optical wavelength demultiplexer of the present invention exhibited an insertion loss of 1.16 dB and a 3 dB passband width of 72.3 GHz. Although not taking into consideration the loss resulting from coupling to the final optical fiber and loss resulting from curved waveguides, the AWG optical wavelength demultiplexer of the present invention exhibited a considerable improvement in insertion loss, as compared to the conventional methods.

It is unnecessary to limit the size of the taper waveguide to a particular size as mentioned above. In accordance with the present invention, it is possible to implement a variety of AWG optical wavelength demultiplexers using a variety of taper waveguides having different sizes, respectively.

While the present invention has been described in detail with reference to the specific embodiment, they are mere exemplary applications. Thus, it is to be clearly understood that many variations can be made by anyone skilled in the art within the scope and spirit of the present invention.

As apparent from the above description, the present invention provides an AWG optical wavelength demultiplexer using a tapered waveguide arranged between the second slab waveguide thereof and the output waveguide thereof, thereby being capable of achieving a reduction in loss. The tapered waveguide of the present invention can be applied to existing optical devices without any problem in regard to fabrication processes.

What is claimed is:

1. An arrayed waveguide grating (AWG) optical wavelength multiplexer/demultiplexer for one of coupling and dividing optical signals of differing wavelengths received at a plurality of input optical waveguides, and outputting the one of coupled and divided optical signals to a plurality of output optical waveguides, respectively, said AWG optical wavelength multiplexer/demultiplexer comprising:

a first slab waveguide for dividing powers of the optical signals coupled from said plurality of input optical waveguides;

an arrayed waveguide grating for guiding the optical signals from said first slab waveguide therethrough so that the optical signals have a constant phase difference between adjacent optical waveguides;

a second slab waveguide for one of coupling and dividing the differing wavelengths of resultant optical signals outputted from said arrayed waveguide grating, and outputting the resultant optical signals to said output optical waveguides, respectively; and a plurality of tapered waveguides interposed between said second slab waveguide and said output optical waveguides, said tapered waveguides being adapted to obtain a flat spectral response while minimizing an insertion loss wherein said tapered waveguides have an adiabatic structure for preventing a power exchange among waveguide modes during passage of optical signals therethrough.

2. The arrayed waveguide grating optical wavelength multiplexer/demultiplexer in accordance with claim 1, wherein said tapered waveguides consist of a linear tapered waveguide.

3. The arrayed waveguide grating optical wavelength multiplexer/demultiplexer in accordance with claim 2, wherein said tapered waveguides have an adiabatic structure for preventing a power exchange among waveguide modes during passage of optical signals therethrough.

4. The arrayed waveguide grating optical wavelength multiplexer/demultiplexer in accordance with claim 1, wherein said tapered waveguides have multi-mode structures at an output terminal of said second slab waveguide.

5. The arrayed waveguide grating optical wavelength multiplexer/demultiplexer in accordance with claim 1, wherein the output terminals of said tapered waveguides have a same size as a size of said output optical waveguides which is coupled thereto, so that said tapered waveguides guide the optical signals to said plurality of output optical waveguides.

6. The arrayed waveguide grating optical wavelength multiplexer/demultiplexer in accordance with claim 1, wherein said arrayed waveguide grating optical wavelength multiplexer/demultiplexer comprises 16 channels, a waveguide channel width of 6.5 $\mu$m, and a refractive index of 0.75% between a core and a cladding layer.

7. The arrayed waveguide grating optical wavelength multiplexer/demultiplexer in accordance with claim 6, wherein said tapered waveguides have a width of 25.3 $\mu$m a length of 4,800 $\mu$m at said output optical waveguides.

* * * * *